Figure 1:
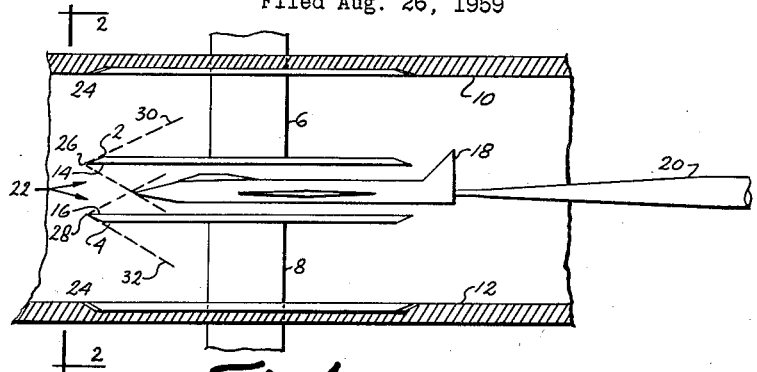

Jan. 1, 1963   R. E. SCHREIBER   3,070,998
SHOCK RELIEF PLATES
Filed Aug. 26, 1959

INVENTOR.
ROBERT E. SCHREIBER
BY
ATTORNEY.

United States Patent Office 3,070,998
Patented Jan. 1, 1963

3,070,998
SHOCK RELIEF PLATES
Robert E. Schreiber, Bellevue, Wash., assignor to Boeing
Airplane Company, Seattle, Wash., a corporation of
Delaware
Filed Aug. 26, 1959, Ser. No. 836,188
3 Claims. (Cl. 73—147)

My invention relates to shock load relief plates (hereafter referred to as proximity plates) and more particularly to shock load relief plates suitable for use in a wind tunnel, which plates protect a test model from excessive loads caused by turbulence associated with starting and stopping a supersonic wind tunnel, and to the method of using these proximity plates to relieve such excessive loads.

When a model is placed in a wind tunnel, it is often supported on a strain gage balance, to record the aerodynamic loads on the model. Since these balances are designed to measure only steady state loads, more severe loads may break the balance or at least upset the precise calibration of the instrument.

This problem becomes especially acute in an atmospheric exhaust supersonic wind tunnel, where the air flow starts from zero and reaches the test Mach number very quickly, i.e. in a couple of seconds or less. When the wind tunnel is started and the flow of air in the tunnel passes the speed of sound, a shock wave travels down the tunnel, often at an oblique angle to the main direction of flow. The flow of air along one side of the tunnel may separate and become turbulent and cause angular and irregular flow from this source of turbulence. Very shortly the flow of air reaches the Mach number for which the nozzle of the tunnel has been set, and the flow of air becomes smooth and steady. At this point, the valuable test data from the balance is recorded. The source of air is then shut off, and the flow drops rather abruptly to zero. As the flow drops from a higher Mach number to zero, a shock wave travels back up the tunnel, and the same conditions of turbulent and irregular flow exist in the tunnel. The whole test cycle may take no more than twenty seconds, and the two transition periods, in which the flow goes up to full velocity and back down to zero velocity, may not be more than a couple of seconds each. But during each of these two very brief transition periods, violent air currents may buffet the model from all angles, and very possibly damage the strain gage balance or make the test data unreliable.

There are problems in physically clamping the model in place to prevent the starting and stopping loads from excessively stressing the model and the balance. To obtain accurate test data, the clamping means would have to be released during the middle portion of the test cycle, and the clamping and unclamping action itself may stress the model beyond the allowable limit.

Therefore an object of my invention is to relieve excessive loads on a test model without touching or clamping the model.

Another object of my invention is to protect the test model from turbulent flow associated with a shock wave by means of two plates positioned adjacent to, and on either side of, the model.

A further object of my invention is to make the plates movable relative to the model so that the model may be free of the plates during the middle portion of a test cycle.

A still further object of my invention is to provide a method of relieving excessive loads by bringing the plates adjacent the model during only the starting and stopping portion of the test cycle.

Figure 2:
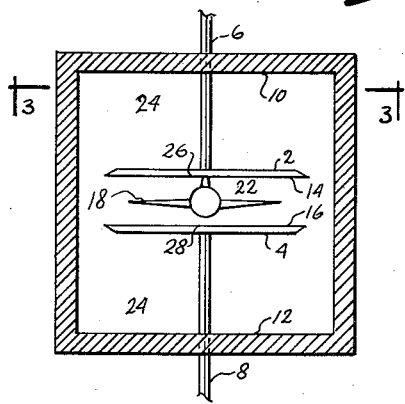
Figure 3:
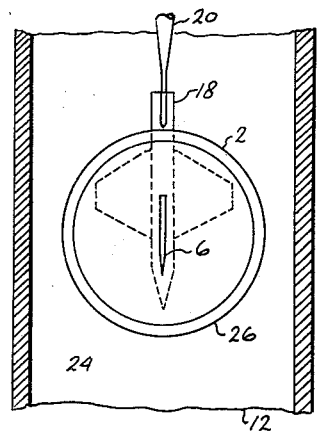

These and other objects of this invention will become apparent from the following description when taken in conjunction with the accompanying drawings in which:

FIGURE 1 shows a side view of my invention with the proximity plates in extended position;
FIGURE 2 is a front view of FIGURE 1;
FIGURE 3 is a top view of FIGURE 1; and
FIGURE 4 is a graphical illustration of the operation of the plates during a complete test cycle.

I shall now describe my invention with reference to FIGURES 1, 2 and 3. Two relatively thin plates 2 and 4 are attached to movable struts 6 and 8 so that the plates 2 and 4 may be retracted into the walls 10 and 12 of the wind tunnel. The plates 2 and 4 each have a substantially flat surface, 14 and 16, respectively, facing each other and disposed adjacent to, and on either side of (in this embodiment above and below), the test model 18 which is mounted on a stem (commonly called a sting) 20 in the middle of the test section of the wind tunnel. In FIGURES 1, 2 and 3 the plates are shown in the extended position so as to form a channel 22 between the surfaces 14 and 16 to accommodate the model 18.

Figure 4:
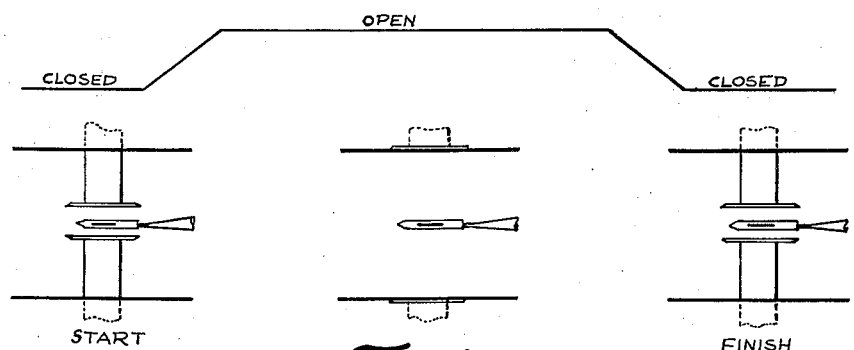

In operation, as shown in FIGURE 4, the model 18 is held in place in the middle of the test section of the wind tunnel by the sting 20, and the plates 2 and 4 are positioned in an extended position, adjacent to, and on either side of, the model 18. The tunnel is started and the velocity of the air quickly increases from zero to the Mach number for which the tunnel is set. Although the flow in the main body of the tunnel 24 is irregular and turbulent during this brief starting period, the flow of air through the channel 22 is straightened considerably by the flat surfaces 14 and 16 and is generally parallel to the flat surfaces 14 and 16 of the plates 2 and 4, and therefore is less turbulent. As the flow in the tunnel passes from subsonic to supersonic, the leading edges 26 and 28 of the plates 2 and 4 do create light shock waves 30 and 32, but these cause little disturbance to the model 18.

As soon as the tunnel reaches the steady flow state (i.e. within a couple of seconds or less) the plates 2 and 4 are withdrawn into the walls 10 and 12 of the tunnel. During this middle portion of the test run, the desired test data is obtained. Just as the flow of air in the tunnel is shut off, the plates 2 and 4 are again extended adjacent the model 18. As the air flow in the main portion 24 of the tunnel drops from fully velocity to zero, there is again turbulence and irregular flow in the tunnel. However, in the channel 22 the flow is again straightened by the flat surfaces 14 and 16 of the plates 2 and 4 thereby permitting little buffeting of the model 18.

Since the exact design of the plates 2 and 4 is not critical, rectangular or circular plates or some other shaped plates would be equally effective. However, the plates 2 and 4 should be relatively thin so that the plates 2 and 4 themselves do not become a source of turbulence or of strong shock waves in the tunnel. All of the model 18 does not have to be in the channel 22 between the flat surfaces 14 and 16 of the plates 2 and 4. However, the major portion of the lift surfaces, such as the wing surfaces, should be protected both above and below by the plates 2 and 4 since turbulent flow would more likely create excessive stress on these surfaces because of their greater area. The wings, at least, being the main recipient of the high shock loads, should thus be covered by the plates 2 and 4. In practice, the plates should be as close to the model 18 as possible without touching the model 18, since the pressure of physical contact might stress the model 18 beyond the allowable limit.

The plates 2 and 4 also provide a certain choking effect in the channel 22 while the flow is accelerating from Mach 1.0 to Mach 2.5. Beyond Mach 2.5 the flow in the channel 22 becomes supersonic and a shock wave will pass down the channel 22. It is known that when a tube is placed in an area of supersonic flow, the flow inside the tube is choked so that the velocity of the flow inside the tube is subsonic. But it was discovered that when the two proximity plates 2 and 4 formed the channel 22, that the flow inside the channel 22 was choked as the main shock wave travelled down the tunnel, but that shortly after this (when the main flow in the tunnel reached Mach 2.5), the flow in the channel 22 became supersonic so that only a light shock wave passed down the channel 22. However, this shock wave did not cause excessive disturbances to the model 18.

During the starting and stopping period of turbulent flow, irregular air flow from the open side portion of the channel 22 may strike the model 18 along its side. However, since this air flow does not strike the larger surfaces of the model 18 with a velocity component normal to these larger surfaces of the model 18, this irregular flow does not cause excessive loads on the model 18.

In the particular embodiment described above, the plates 2 and 4 are movable by being retracted into the walls 10 and 12 of the tunnel. However, it is only necessary that the plates 2 and 4 be movable relative to the model 18, so that the model 18 may be relatively free of the plates 2 and 4 during the middle portion of the test run. Therefore, the plates 2 and 4 may be made stationary, and the model 18 movable to be able to move free of the plates 2 and 4. Both the plates 2 and 4 and the model 18 might be made movable, or the plates 2 and 4 may be movable in a manner other than the one shown.

Since numerous changes may be made in the above apparatus and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a wind tunnel containing a test model having lift surfaces, wherein excessive loads on the lift surfaces occur because of turbulent fluid flow during a test cycle, comprising: two plates, substantially parallel to each other, said plates and the test model being movable with respect to one another so that said plates may be positioned adjacent to and on either side of the test model with the major portion of the lift surfaces of the test model disposed between and substantially parallel to said plates, so as to establish a channel between said plates that is positioned in substantially the same direction as the direction of said fluid flow down the wind tunnel to thus protect the test model from excessive loads during periods of turbulence.

2. The device as claimed in claim 1, wherein said plates are movable with respect to the wind tunnel.

3. The method of protecting a model, having lift surfaces, in a wind tunnel from excessive loads during periods of turbulent fluid flow which occur at the starting and stopping portions of a test cycle, comprising the steps of: prior to the occurrence of turbulent fluid flow during the starting portion of the test cycle, positioning two plates substantially parallel to each other in such a manner that said parallel plates are adjacent to, and on either side of the model, with the major portion of the lift surfaces of the model disposed between and substantially parallel to said plates, moving said plates away from the model during the middle portion of the test cycle, and returning said plates adjacent to the model prior to the occurrence of turbulent fluid flow during the stopping portion of the test cycle.

References Cited in the file of this patent

UNITED STATES PATENTS

| | | |
|---|---|---|
| 2,488,810 | Easterday | Nov. 22, 1949 |
| 2,551,470 | Smith | May 1, 1951 |
| 2,580,228 | Johnson | Dec. 25, 1951 |
| 2,582,814 | Beman et al. | Jan. 15, 1952 |
| 2,776,806 | Brendal | Jan. 8, 1957 |